United States Patent
Greenberg et al.

[15] 3,682,571
[45] Aug. 8, 1972

[54] SEMI-AUTOMATIC APPARATUS FOR MOLDING PLASTIC COPINGS AND SIMILAR ARTICLES

[72] Inventors: Samuel Greenberg, Montgomeryville; Abe Jacobs, Philadelphia, both of Pa.

[73] Assignee: Samuel Greenberg, Montgomery County, Pa.

[22] Filed: May 28, 1970

[21] Appl. No.: 41,510

[52] U.S. Cl. ............425/193, 264/89, 425/157, 425/169, 425/388
[51] Int. Cl. ............................................B29c 17/04
[58] Field of Search.......18/5.7, 19 D, 19 F, DIG. 60; 32/2; 264/88, 89, 92, 93

[56] References Cited

UNITED STATES PATENTS

| | | | |
|---|---|---|---|
| 3,528,132 | 9/1970 | Greenberg et al | 18/19 F |
| 3,404,056 | 10/1968 | Baldwin | 18/5.7 |
| 3,072,964 | 1/1963 | Tilden | 18/19 F |
| 3,600,752 | 8/1971 | Kopp | 18/19 H |

Primary Examiner—J. Spencer Overholser
Assistant Examiner—Lucius R. Frye
Attorney—Max R. Millman

[57] ABSTRACT

Apparatus for molding or forming dental members such as waxing copings, transfer copings, full models of the teeth or mouth, teeth guards, medicament applicators and the like employing a heater movable out of an inoperative to an operative position over a plastic disk holder to soften the plastic and a pressure dome to engage the holder and force it into contact with a receptacle retaining male dies over which the softened plastic disk is draped, the movement of the heater into the inoperative position automatically causing the dome to move into engagement with the plastic disk holder and to apply pressure therein for the molding operation. A manually operable valve is employed to move the pressure dome into an inoperative position out of engagement with the holder.

11 Claims, 4 Drawing Figures

INVENTORS
SAMUEL GREENBERG
ABE JACOBS
BY
ATTORNEY

INVENTORS
SAMUEL GREENBERG
ABE JACOBS
BY
Max R. Millman
ATTORNEY

SEMI-AUTOMATIC APPARATUS FOR MOLDING PLASTIC COPINGS AND SIMILAR ARTICLES

This invention relates to the molding or forming of dental members such as waxing copings, transfer copings, full models of the teeth or mouth, splints, teeth guards, medicament applicators and the like of plastic, the primary object of which is to accomplish the molding in a dental laboratory or by the dentist himself economically, accurately, and efficiently. To the extent that the apparatus of the invention is of less complex and costly construction, it constitutes an improvement over the apparatus of application Ser. No. 756,750 filed Sept. 3, 1968 now U.S. Pat. No. 3,528,132 owned by the same assignee, Samuel Greenberg.

Another object of the invention is to provide apparatus for molding plastic members of the character described which involves a combination of simple manual manipulations requiring a minimum of skill and automatic operations to accomplish the entire molding process, thus effecting a significant saving of time and labor with an apparatus which is less costly and easier to repair and to replace parts when required.

Another object of the invention is to provide apparatus for molding plastic dental members of the character described which involves a combination of simple sequential manual manipulations to carry out the entire operation which is capable of being performed with a minimum of skills.

Another object of the invention is to provide apparatus for molding plastic dental members which, although operable by a combination of manual and automatic operations is nevertheless capable of producing plastic copings, models and the like members which closely and accurately conform to the shape of the male members over which the plastic is draped during the operation of the apparatus, without causing any warping in the formed member, so that the same can be readily refitted after trimming upon the male members.

A further object of the invention is to provide an apparatus for molding plastic copings and the like employing a heater movable out of an inoperative to an operative position over a plastic disk holder to soften the plastic and a pressure dome to engage the holder and force it into contact with a receptacle retaining male dies over which the softened plastic disk is draped, the movement of the heater into the inoperative position automatically causing the dome to move into engagement with the plastic disk holder and to apply pressure therein for the molding operation.

These and other objects of the invention will become more apparent as the following description proceeds in conjunction with the accompanying drawings, wherein.

Specific reference is now made to the drawings in which similar reference characters are used for corresponding elements throughout.

Figure 4:
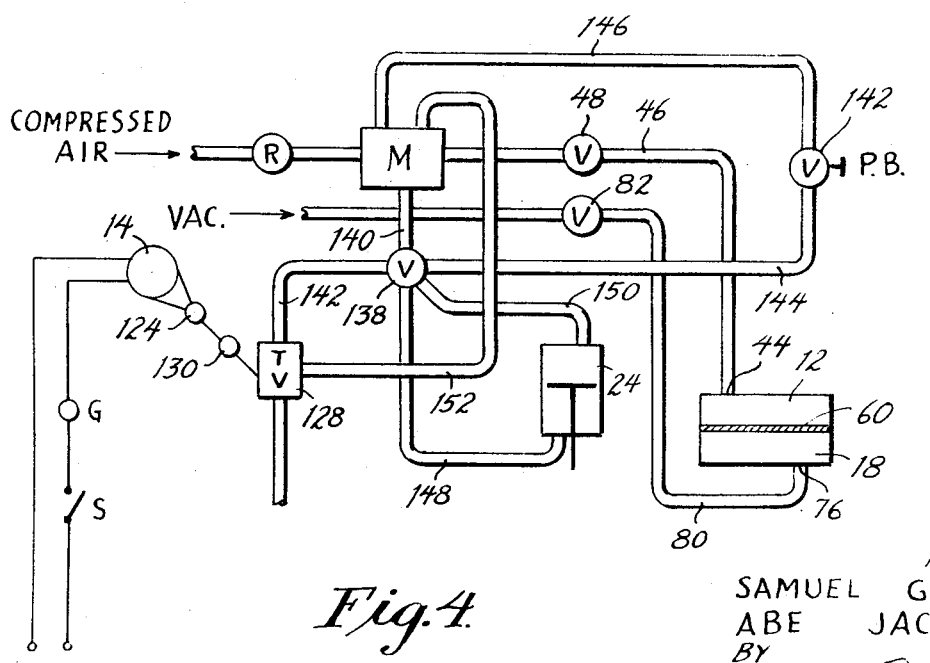
FIG. 4 is a schematic view of the electrical and pneumatic circuits.

The present apparatus is one in which plastic waxing copings, transfer copings, full models of teeth, splints, guards, medicament applicators and the like articles can be readily and easily molded and comprises generally a hollow housing 10, a pressure dome 12, a heater 14, a plastic disk holder 16, and a receptacle 18 for removably retaining male dies, all mounted on various means on the upper wall 20 of the housing 10 whose peripheral wall 22 encloses the pneumatic and electrical operating units shown diagrammatically in FIG. 4.

Within the housing is a pneumatic cylinder 24 whose upper wall is the upper wall 20 of the housing and whose lower wall is indicated at 26, there being a piston rod 28 which extends movably through the lower wall 26 and is coupled at its lower end as at 28 to a cross bar 30, the upper end of the piston rod carrying a piston 32.

A pair of spaced posts 34 and 36 are secured at their lower ends to the ends of the cross bar 30 and extend reciprocably through the upper wall 20 of the housing. At their upper ends the posts are secured to the dome 12 in the general form of a disk-like plate 38 having a bottom opening recess forming a cavity 40, a viewing window 42 thereabove, and a laterally extending port 44 communicative with the cavity 40 which connects via a flexible conduit 46 to a one-way tripping valve 48 which is in turn connected to a source of compressed air (not shown) via a manifold M and pressure regulator R, see FIG. 4. The bottom surface of dome plate 38 is provided with a sealing means 50.

The holder 16 for plastic disks to be formed into the desired copings, models, splints, guards, etc. comprises essentially upper and lower rings 52 and 54. In vertical cross-section, the rings are of mating step section as shown at 56 thus providing an annular ledge 58, in the lower ring upon which a plastic disk 60 is removably mounted and held tightly in place when the upper ring 52 is made to engage the lower ring 54, the upper ring carrying a sealing member 62 which presses against the disk. Thus the disk extends across the opening centrally of the rings.

The receptacle 18 is removably mounted on the upper surface of the wall 20 and has an annular wall 64 whose diameter approximates that of the plastic disk holder 16 and a bottom wall 66. A continuous groove is provided in the receptacle, one portion 68 of which extends diametrically of the bottom wall 66 while the end portions 70 thereof extend vertically up the annular wall 64 to its upper edge. Extending through the bottom wall and the groove portion 68 is a pair of holes 72 which removably receive locating pins 74 upstanding from the upper housing wall 20 and serving as the receptacle mounting means. A further hole 76 is provided in the bottom wall 66 of the receptacle and registers with a hole 78 in the upper housing wall 20 and is connected via a conduit 80 and a one-way tripping valve 82 to a vacuum source (not shown) as seen in FIG. 4. The annular wall 64 of the receptacle is equipped with a carrying handle 83.

Circumferentially spaced pins 84 extend into recesses opening through the upper edge of the receptacle behind which are springs 86 which urge the pins upwardly into recesses 88 in the lower surface of the lower ring 54 of the plastic disk holder there being a sealing gasket on the upper surface of the cup to engage the lower surface of the lower ring 54.

A cup member 90 of smaller diameter than the receptacle 18 and made generally of plastic, is placed removably in the receptacle and includes a bottom wall 92 which rests on the bottom wall 66 of the receptacle and an annular wall 94 which is spaced inwardly of the annular wall 64 of the first receptacle. The cup 90 is nearly filled with a conventional dental molding compound 96 upon whose top surface is mounted a layer 98 of a resilient foam or sponge material.

Although a wide variety of products can be made by the instant invention, as indicated hereinbefore, the same will be described with reference to the making of copings. After the dentist has taken an impression of a tooth, a male member or die 100 is made to conform thereto of conventional materials, such as metal, stone, epoxy, etc. The die has a tapered shank or stem portion and an upper crown portion 102 corresponding to the impression taken by the dentist. The die is inserted into the molding compound 96 through the sponge separator 98 with its crown portion 102 extending beyond the separator. A plurality of different dies may be inserted in the molding compound if desired.

The heater 14, preferably disk-shaped and equipped with an electric coil heating element at its undersurface, is secured as by a gusset 104 to another vertical post 106 which is disposed behind the dome post 36 and which extends rotatably through the upper housing wall 20. Secured to the post 106 and bearing on the upper housing wall is a collar 108 which fixes the vertical position of the post.

Secured to the post 106 above the collar 108 is a substantially rectangular yoke member 110 between the furcations 112 of which extends one end of an elongated handle 114, with a knob 115 thereon, there being a pivot pin 116 which extends diametrically through and is carried by the handle, which pin is rotatably mounted in the furcations 112 so that the handle is pivotally attached to the yoke member for movement in a vertical plane towards and away from the upper housing wall. Upstanding from the upper housing wall 20 and spaced apart about 90° are pins 118 and 120 for alternate engagement in a vertical through hole 122 in the handle 114 intermediate its ends.

At the lower end of the post 106 a cam finger 124 is secured which extends radially therefrom. Affixed by suitable means, as by a bar 126 dependent from the bottom 26 of the pneumatic cylinder 24, is a conventional normally closed, two-port, spring return one-way short lever tripping valve 128 whose lever 130 is tripped by the movement of the cam 124 in one direction only. Such valves are commercially available. A suitable one is made by Modernair Corporation of Angola, Indiana under the designation Model 204 One-Way, Short Lever control valve. The valves 48 to the source of air under pressure and 82 to vacuum are also normally closed, two-port, spring return lever operated tripping valves as will be seen more clearly in FIG. 2, except that they are actuated to open only in one direction by the cross-bar 30.

The entire pneumatic and electrical circuit shown diagrammatically in FIG. 4, except for the sources of vacuum and compressed air, is contained in the housing 10 upon one face of which is secured a control panel 132 through which is mounted a main on-off switch S, a glow lamp G, a push button switch PB and mechanical timer 134 with a buzzer (not shown) and operating knob 136.

Figure 2:
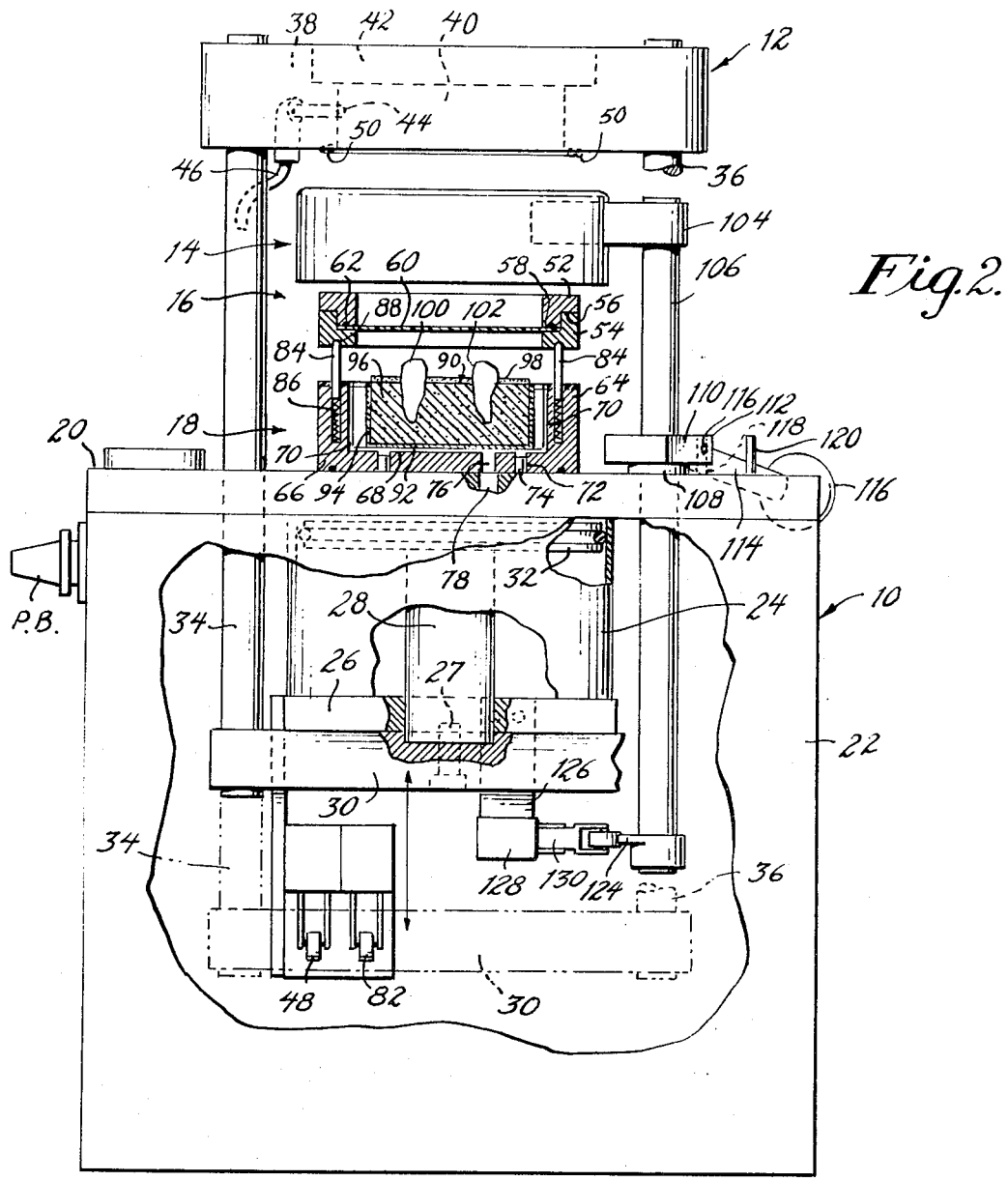
FIG. 2 is an elevational view looking from the line 2—2 of FIG. 1, parts being broken away and shown in section to show further details.
Figure 3:
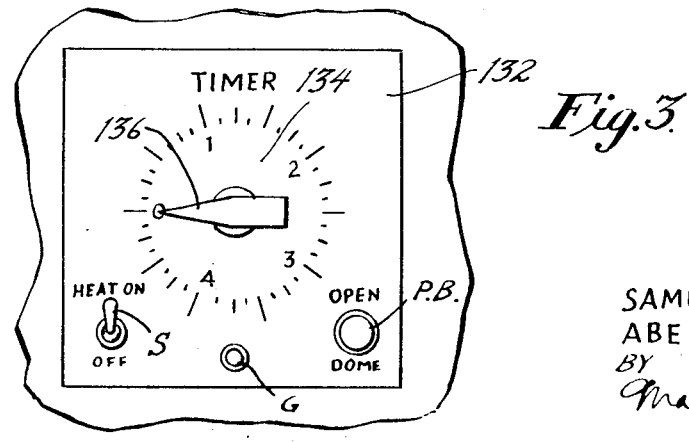
FIG. 3 is a face view of the control panel on the front of the apparatus including the manually operable switches.

In use, the dies 100 are inserted in the molding compound 96 through the separator 98 with the crowns 102 exposed and the cup 90 containing the same is placed in the receptacle 18. The plastic disk 60 is placed in the holder 16 which is then mounted on the receptacle via the spring-loaded pins 84, and with the aid of the handle 83 of the receptacle, this assembled unit is placed on the upper housing wall with the locating pins 74 extending into the holes 72, at which time the hole 76 in the bottom of the receptacle and the hole 78 in the upper housing wall are in registry, as shown in FIG. 2.

Figure 1:
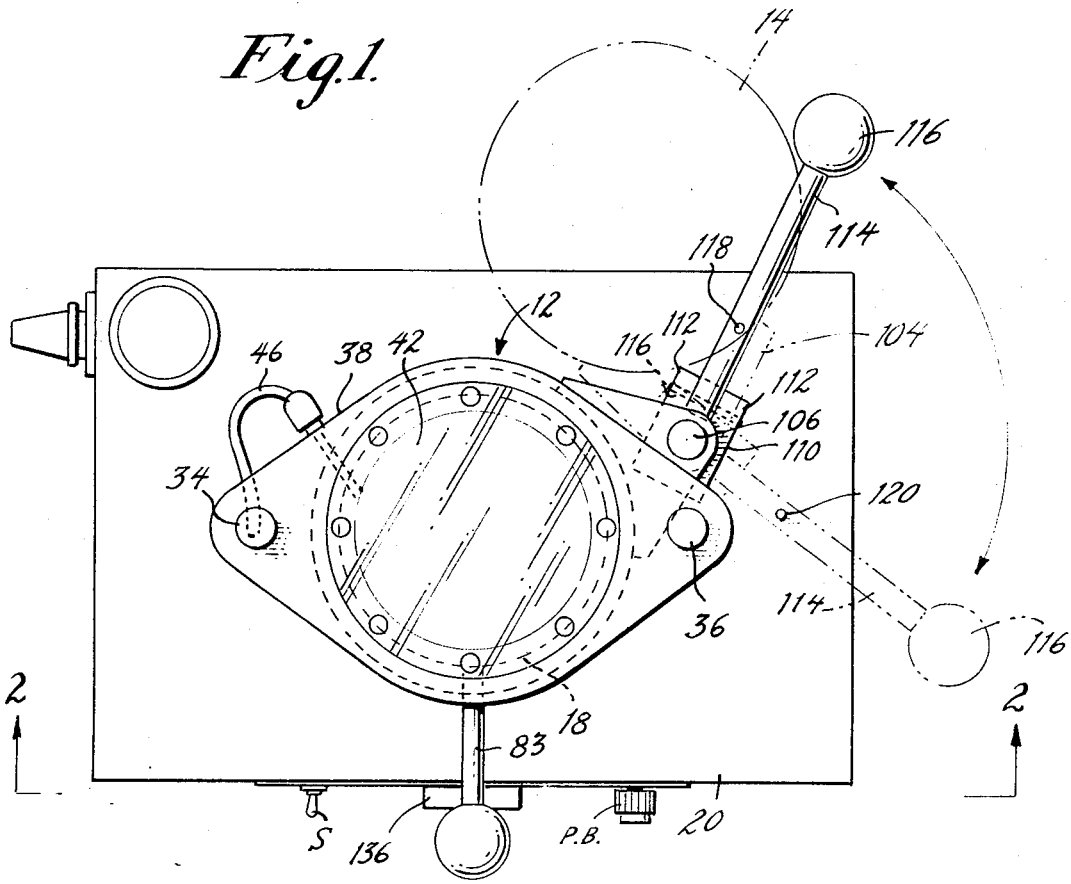
FIG. 1 is a top plan view of the apparatus.

The switch S is then thrown to the on position which energizes the heater 14 and lights up the glow lamp G. The handle 114 is then raised free of the pin 120 and rotated from the inoperative position out of the way of the plastic holder to the operative position directly over the holder as shown respectively in the dotted and solid line positions in FIG. 1. The operative position is automatically obtained when the through hole 122 engages the pin 118. In this movement of the handle in the counterclockwise direction, post 106 rotates in the same direction and the cam finger 124 wipes the trip lever 130 of the valve 128 but does not trip the valve.

The timer is then set by turning the knob 136 to the desired time setting depending upon the kind and thickness of thermoplastic plastic disk employed. When the knob returns to the zero setting, the buzzer sounds whereupon the operator lifts the handle 114 and rotates it clockwise to the inoperative position. Just prior to insertion of the through hole 122 of the handle into the pin 120, the cam finger 124 engages the trip lever 130 and thereby trips the normally closed valve 128 to the open position and then the through hole 122 of the handle is inserted in the pin 120.

The valve 138 is a four-way, five-port, shifting spool, valve, commercially available from numerous sources. One such commercial unit is Model 1800 made by Fabco Air Inc. of Seville Ohio. One port communicates via conduit 140 ultimately to the source of compressed air; another port communicates via conduit 142 with the tripping valve 128; a third port communicates via conduit 144 with the normally closed push button valve PB whose return conduit to the compressed air source is 146; a fourth port communicates via conduit 148 with the bottom of the cylinder 24; and a fifth port communicates via conduit 150 with the top of the cylinder 24, the return conduit from the tripping valve 128 being indicated at 152, see FIG. 4. In its normal position, all four ports but the one communicating with conduit 150 to the top of the cylinder 24 are open so that the dome is normally in the raised position since air pressure is exerted upwardly below the piston 32 in the cylinder 24.

When the valve 28 is tripped to the open position by the cam 130, a shot of air from the source through the conduit 152 through the tripping valve and through the conduit 142 shifts the spool of the four-way valve 138 so that only the port to the top of the cylinder 24 is opened, it being understood that the port to the air source via conduit 140 always remains open. In the meantime, the tripping valve has reclosed. Air under pressure from the source through conduit 140, valve 138 and conduit 150 enters the top of the cylinder and pushes down on the piston 32 to lower the dome.

At the lowermost position of the cross-bar 30, i.e. when the dome has forced the holder 16 against the receptacle to completely enclose the male dies, the cross-bar 30 engages the trip valve 48 alone (when only compressed air is to be admitted into the dome) or both trip valves 48 and 82 (when a pressure-vacuum combination is used) which opens the normally closed valves 48 and 82 to allow air under pressure to pass into the dome via conduit 46 and air to be withdrawn from the receptacle via conduit 80 at the same time. As long as the cross-bar 30 contacts the levers of the trip valves 48 and 82 they remain open.

The timer is then reset for a period of time for applying pressure alone or pressure and vacuum in the dome to effect the molding of the plastic disk on the male molds, the time required depending upon the nature of the plastic used and the thickness of the disk. When the timer knob 136 returns to its zero position and the buzzer sounds, the push button valve is depressed to open it which allows compressed air to enter the four-way valve 138 via conduits 146 and 144 which causes the spool therein to shift back to its original position closing off the port to the top of the cylinder 24 and opening the port to the bottom of the cylinder. In so doing, the piston is raised as is the dome and as soon as the cross-bar carried by the piston rod clears the levers of the trip valves 48 and 82, they reclose to cut off the compressed air to the dome and the vacuum to the receptacle. When the dome reaches its uppermost position, with the heater still out of the way in its inoperative position, the molded plastic is removed from the holder. Thus, all that is required, after loading the receptacle with the male dies therein and the plastic disk holder thereon on the upper wall 20 of the housing, is to turn the handle counterclockwise and hook it over the pin 118, set the timer, turn the handle clockwise when the buzzer sounds and hook it over the pin 120, set the timer again, and when the buzzer sounds again, press the push button PB, and finally remove the receptacle and then the molded plastic from the holder.

It should be understood that the delivery of compressed air in the dome relative to the vacuum simultaneously applied to the bottom of the receptacle creates a greater positive pressure in the dome and also causes air circulation around the softened plastic disk draped on the male dies. By providing a diametrical groove 68 in the bottom of the receptacle upon which the die-retaining cup 90 rests, a path for air withdrawn by the vacuum is assured. Since the die-retaining cup is generally made of plastic and can expand, the groove portion 70 vertically along the peripheral wall of the receptacle also assures a path for air withdrawn by vacuum should the cup expand by the applied pressure and contact the peripheral wall of the receptacle.

In practice, it was found that the air pressure in the dome should be in the order of magnitude of 70 psi and the vacuum applied to the receptacle in the order of magnitude of 15 inches or more. Air pressure alone may, if desired, by employed in the order of magnitude of 70 psi, in which case there is no circulation of air in the enclosed space around the softened disk.

A wide variety of thermoplastic plastics may be employed depending upon whether one desires to make a waxing coping, a transfer coping, a temporary splint, a base plate, an impression tray, a mouth guard or a medicament applicator and may include polyethylene, polystyrene, Alathon (an ethylene-vinylacetate copolymer made by DuPont), Surlyn (an ionomer resin made by DuPont) and the like.

While a preferred embodiment of the invention has here been shown and described, it is understood that skilled artisans may make minor variations without departing from the spirit of the invention.

What is claimed is:

1. Apparatus for forming plastic dental copings, models, splints, guards, trays and the like comprising a support, a receptacle to removably retain male dies, a holder to removably retain a plastic sheet, resilient means urging said holder above said receptacle, a heater, manually operable means rotatably mounting said heater on said support for movement from an inoperative position to an operative position directly above said holder to soften the plastic sheet, a dome mounted on said support above said holder, pneumatic means to reciprocate said dome vertically from an upper inoperative position to a lower operative position in contact with said holder to compress said resilient means and cause the plastic sheet to engage the male dies, a normally closed conduit from a source of air under pressure to said dome, said pneumatic means normally holding said dome in its upper inoperative position, means causing said pneumatic means to lower said dome into its operative position only when said heater is moved into its inoperative position, and means to open said conduit when said dome is in its operative position to apply air pressure through said dome over said plastic sheet and cause the plastic sheet to drape over the male dies, said pneumatic means including a cylinder having a piston and piston rod reciprocable therein, means securing said piston rod to said dome externally of said cylinder, a pneumatic circuit from a source of air under pressure to the top and bottom of said cylinder and a first valve in the circuit normally closing off communication to the top of said cylinder and keeping communication open to the bottom thereof, said means causing said pneumatic means to lower said dome including a cam finger on said means rotatably mounting said heater and a second normally closed one-way tripping lever valve in said pneumatic circuit actuatable by engagement with said cam finger only when said heater is in its inoperative position to open the same and cause the first valve to open communication to the top and close it to the bottom of said cylinder and thus lower said dome.

2. The apparatus of claim 1 and a normally closed second conduit from a source of vacuum to said receptacle and means to open said second conduit when said dome is in its operative position.

3. The apparatus of claim 1 and a third normally closed manually operable valve in the pneumatic circuit which when actuated will return said first valve to its original position closing off communication to the top of said cylinder and opening communication to the bottom thereof to raise said dome to its inoperative position.

4. The apparatus of claim 1 wherein said means to open said conduit from the source of air under pressure to said dome includes a normally closed tripping valve operatively connected in said conduit and carried by said support and actuatable by contact with said means securing said piston rod to said dome when said dome is in its lower operative position.

5. The apparatus of claim 4 and a normally closed second conduit from a source of vacuum to said receptacle and means to open said second conduit when said dome is in its operative position.

6. The apparatus of claim 5 wherein said means to open said second conduit from the source of vacuum to said receptacle includes a normally closed tripping valve operatively connected in said second conduit and carried by said support and actuatable by contact with said means securing said piston rod to said dome when said dome is in its lower operative position.

7. In apparatus for forming plastic dental copings, models, splints, guards, trays and the like including a housing having an upper wall, a receptacle to removably retain male dies removably mounted on said wall, a holder to removably retain a plastic sheet mounted above said receptacle for vertical movement to and from said receptacle, a pressure dome above said holder, at least one post extending through said wall secured at its upper end to said dome and having a lower end disposed in said housing and pneumatic means operatively connected to the lower end of said post to raise said dome to an inoperative position above said holder and lower it to an operative position against said holder and in turn against said receptacle to enclose the plastic disk and male dies; a heater, a post securing said heater adjacent its upper end and extending rotatably through said housing wall, said pneumatic means normally acting to raise said dome to its inoperative position, a first valve means coactive between said lower end of said heater post and said pneumatic means to cause it to lower said dome to its operative position only when said heater is rotated from an operative position directly above said holder to an inoperative position to one side of said holder, a normally closed conduit from a source of air under pressure to said dome, and a second valve means coactive between the lower end of said dome post and said conduit to open said conduit and deliver air under pressure to said dome only when said dome is in its lower operative position, said pneumatic means including a cylinder having a piston and piston rod reciprocable therein, a bar connecting the lower end of said dome post to said piston rod externally of said cylinder, a pneumatic circuit from a source of air under pressure to the top and bottom of said cylinder and a master valve in the circuit normally closing off communication to the top of said cylinder and keeping communication open to the bottom thereof, the first valve means including a cam finger at the lower end of said heater post and a first one-way normally closed tripping lever valve secured in said housing and operatively connected in said pneumatic circuit actuatable by engagement with said cam finger, when said heater is rotated to its inoperative position, to open said tripping lever valve and cause said master valve to open communication to the top of said cylinder and close communication to the bottom thereof to lower said dome to its operative position.

8. The apparatus of claim 7 and a handle pivotally secured to said heater post above said housing wall for movement vertically towards and away from said wall and spaced pins alternately engageable in a through hole provided in said handle to retain said heater selectively in its operative and inoperative positions.

9. The apparatus of claim 7 wherein said second valve means includes a second normally closed tripping lever valve engageable with said bar at the lower end of said dome post, when said dome is in its lower operative position, to open said second tripping lever valve and thus open said conduit from the source of air under pressure to said dome.

10. The apparatus of claim 9 and a second normally closed conduit from a source of vacuum to said receptacle and a third normally closed tripping lever valve engageable with said bar at the lower end of said dome post, when said dome is in its lower operative position, to open said third tripping lever valve and thus open said second conduit from the vacuum source to the receptacle simultaneously with the opening of said second tripping lever valve.

11. The apparatus of claim 7 wherein said master valve is a four-way valve and a further manually operable normally closed valve in said pneumatic circuit which when actuated to the open position when the dome is in its lower operative position will cause said master valve to return to its original position closing off communication to the top of said cylinder and opening up communication to the bottom of said cylinder to raise said dome to its inoperative position after molding of said plastic disk on said male dies is completed.

* * * * *